Jan. 7, 1964 G. LEHNERT ETAL 3,116,865
APPARATUS FOR DRAWING METAL TUBING
Filed July 3, 1962
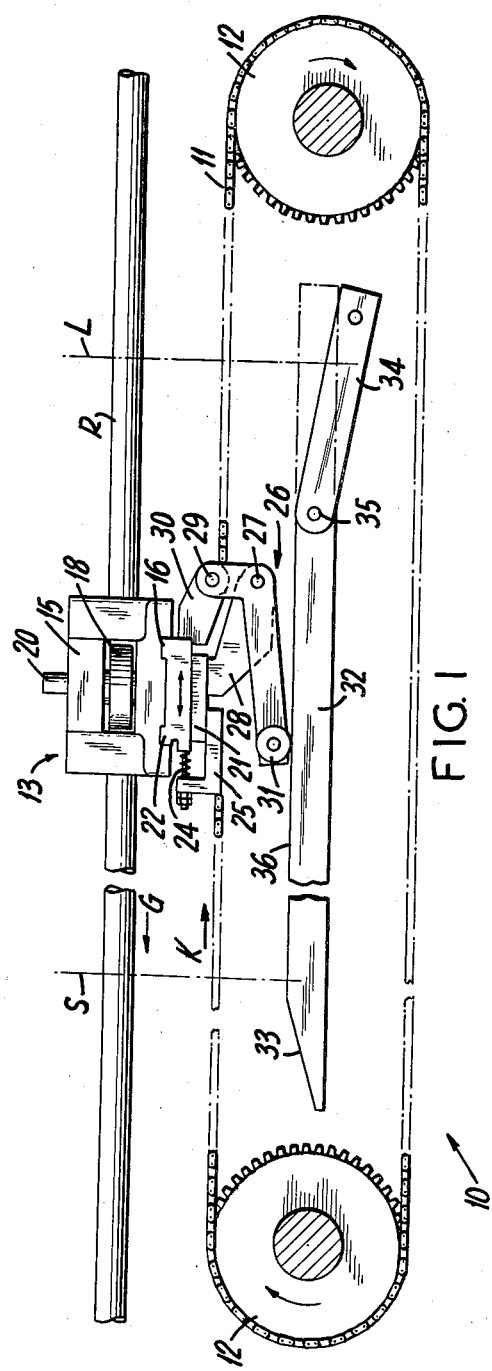
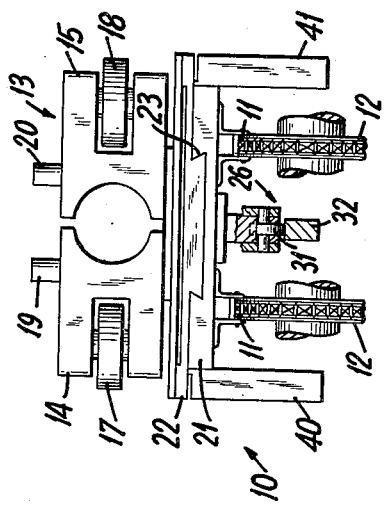
INVENTORS.
GUNTHER LEHNERT
FRIEDRICH SCHATZ
BY
ATTORNEY.

United States Patent Office 3,116,865
Patented Jan. 7, 1964

3,116,865
APPARATUS FOR DRAWING METAL TUBING
Gunther Lehnert, Hannover-Bothfeld, and Friedrich Schatz, Hannover, Germany, assignors to Hackethal-Draht- und Kabel-Werke AG., Hannover, Germany, a corporation of Germany
Filed July 3, 1962, Ser. No. 207,202
Claims priority, application Germany Feb. 1, 1962
8 Claims. (Cl. 226—173)

This invention relates to apparatus for making metal tubing, and more particularly concerns gripping means for transporting metal tubing as the same moves between seam forming means and means for corrugating the freshly formed tubing.

In Patent 3,023,300 there is described means for releasably gripping metal tubing, such as the sheath for electric cables, as the same moves between a station at which a longitudinal seam is welded in the tubing, and a station at which the freshly formed tubing is corrugated to increase the flexibility thereof; the gripping means being effective to prevent rotational displacement and torsional stresses from being transmitted from the corrugating station to the welding station and the consequent impairment of the welded seam.

Also, in application Ser. No. 195,593, filed May 17, 1962, the gripping means as set forth in said patent includes spring loaded means for adjusting the clamping force applied to the gripped tubing.

In certain electrical applications of corrugated metal tubing produced by apparatus of said patent, e.g. as the outer conductor of coaxial cables, or as a hollow conductor for the transmission of electromagnetic waves of very high frequency, it is important that the tubing gripping means which acts as a pull-off device, shall operate very smoothly and without any jerky movements, which are likely to occur when the clamping means is released from engagement with the tubing. Such uneven operation can result in slight wall deformations in the tubing which will give rise to electrical reflections of an undesirable character.

Accordingly, an object of this invention is to provide improved gripping means for moving metal tubing wherein the release of the gripping means relative to the tubing occurs smoothly and without jerky movements which may impair the tubing wall.

A further object of this invention is to provide in gripping means for moving metal tubing which includes laterally related movable clamping means adapted to move into engagement with the tubing and thereafter out of engagement with said tubing to provide pull-off means for moving the tubing between welding and corrugating stations, means for altering the equilibrium between the pull-off force and the opposing force due to the inertia of the tubing and to reduce said pull-off force to zero instantly upon disengagement of the clamping means relative to the tubing.

Other objects of this invention will in part be obvious and in part hereinafter pointed out.

In the drawing, FIG. 1 is a side elevational view in diagrammatic form showing the gripping means of the instant invention; and FIG. 2 is a transverse view thereof with parts in section.

In Patent 3,023,300 and said application Ser. No. 195,593, the means for gripping the metal tubing as the same moves between welding and corrugating stations, comprises a series of gripper assemblies secured to endless chains mounted on longitudinally spaced sprocket wheels to provide for movement of the gripper assemblies in a determined path, together with means for moving opposed clamping elements of the assemblies into gripping engagement with the metal tubing and to retain such grip until a point slightly in advance of a corrugating station where the clamping elements are disengaged from the tubing.

In accordance with the instant invention, the connection between the gripper assemblies and the chains is made by a pair of associated members which may be selectively locked together for conjoint movement or may be arranged for relative longitudinal movement whereby the connection between said assemblies and the moving chains may be broken at a determined point in the movement of the metal tubing.

Thus, as shown in FIG. 1, the gripper assembly which constitutes pull-off means for metal tubing R as the same moves from left to right between a corrugating station, not shown, and a welding station, not shown, is generally designated at 10. The same comprises a pair of parallel endless chains 11 entrained about sprocket wheels 12, one of which is rotated by suitable means, not shown. A series of gripper assemblies 13 are mounted on chains 11 at spaced intervals; each assembly comprising laterally related clamping members 14, 15 arranged for movement towards and away from each other on a slide rail 16, in a manner detailed in said Patent 3,023,300.

The clamping members 14, 15 include rollers 17, 18 on the outer edges thereof for engaging a cam track, not shown, whereby members 14, 15 are moved toward each other to clamp tubing R, and thereafter are displaced from each other to release tubing R, by way of upstanding studs 19, 20 which engage wedge means, not shown, located to effect such displacement at the proper point in the travel of tubing R, all as set forth in detail in said Patent 3,023,300.

The gripper assemblies 13 are mounted on a pair of superposed members 21, 22 arranged for relative longitudinal displacement; said members 21, 22 being interconnected by a dovetail connection indicated at 23. The lowermost member 21 is secured to chains 11. Members 21, 22 are coupled together by a spring member 24 which may be adjusted on a stem fixed to a member 25 extending from member 21.

Mounting members 21, 22 are further coupled by an angle lever 26 pivoted at 27 on a bracket 28 extending from member 21; the short arm of the lever 26 being pivoted at 29 on a bracket 30 extending from member 22. The long arm of lever 26 is provided at its free end with a roller 31 which is adapted to bear on a guide rail 32 extending longitudinally between chains 11.

Guide rail 32 comprises a short tapered portion 33 at the near end thereof, and an adjustable portion 34 pivotally attached to the far end thereof, as at 35. Guide rail portion 34 may be fixed in any desired angular position by lock screws, not shown.

In operation, as chains 11 move to advance the gripper assemblies 13 and as clamping elements 14, 15 move toward each other to grip tubing R through the action of rollers 17, 18 as they engage the cam track, not shown; the roller 31 rides up on guide rail portion 33 to the fixed guide surface 36 of rail 32 thus maintaining members 21, 22 in fixed relation to each other while members 14, 15 grip tubing R, starting at the point indicated at S. The pull-off force K acting through lower member 21 presses roller 31 into contact with guide rail surface 36 and with the fixed relationship between members 21, 22, the pull-off force is fully transmitted to clamping elements 14, 15.

When roller 31 moves onto the upper guide surface of guide rail portion 34, the angularly depressed position thereof allows the lever 26 to yield to the opposing force G represented in the resistance offered by the mass of tubing R which is also transmitted by clamping elements 14, 15 via member 22 to said lever 26. This produces a gradual movement of member 22 carrying said clamping elements 14, 15, relative to member 21 and against the force of spring 24.

Thus, the clamping elements 14, 15 and member 22 have a restrained movement relative to the constant pull-off force exerted by chains 11. The angular position of guide rail portion 34 may be precisely adjusted and coordinated with the adjustment of spring 24 to achieve a complete balance of the pull-off force K and to neutralize the same at the precise moment when clamping elements 14, 15 are disengaged from tubing R, as at point L.

It is understood that tubing R is still gripped by a gripper assembly 13 following the assembly whose elements 14, 15 are disengaged from tubing R. Also, the force of spring 24 is less than the pull-off force K. When the roller 31 of a particular assembly 13 leaves guide rail portion 34, spring 24 is effective to restore members 21, 22 to their normal, neutral relative positions.

The assemblies 13 are guided in their longitudinal movement in the frame, not shown, by side members 40, 41 secured to lateral portions of the lowermost mounting member 21, as shown in FIG. 2.

It has been found that at least 8 assemblies 13 should be mounted on chains 11 and in a fashion such that at least two of said assemblies firmly grip tubing R at any given time. This arrangement maintains the continuity of the pull-off and assures a firm grip on the tubing while following assemblies 13 release the tubing R, thus preventing the balancing of forces at the release point L from affecting the continuity of the pull-off.

As various changes might be made in the embodiment of the invention herein disclosed without departing from the spirit thereof, it is understood that all matter herein shown or described shall be deemed illustrative and not limiting except as set forth in the appended claims.

What is claimed is:

1. In a device for gripping metal tubing moving in a longitudinal path between longitudinally spaced points and comprising a plurality of gripper assemblies, each assembly including a pair of laterally related clamping elements arranged for movement toward and away from each other for engaging and disengaging the moving tubing, and means for moving said gripper assemblies in successively spaced relation in said path, the improvement comprising means for mounting each gripper assembly on said moving means, said mounting means comprising a pair of associated members arranged for relative longitudinal movement, one of said mounting members being fixed to said gripper assembly, means for resiliently connecting the other of said mounting members to said moving means, means movably interconnecting said mounting members, said last mentioned means including operating means, and control means along said longitudinal path engageable with said operating means for adjusting the relative longitudinal positions of said mounting members in accordance with the position of said gripper assembly in said longitudinal path and to allow relative movement of said associated mounting members at a predetermined point in the travel of said tubing when said gripper assembly disengages said tubing.

2. In a device as in claim 1 wherein said moving means comprises a pair of endless chains in parallel relation, and sprocket wheels for driving said chains, said pair of mounting members including interconnecting portions allowing relative longitudinal movement only, one of said pair of members being secured to said chains, spring means coupling said pair of mounting members, lever means coupling said pair of mounting members, said lever means including a free arm portion and guide rail means operative to engage said free arm portion of the lever means for maintaining said pair of mounting members in fixed relation to each other over a determined portion of the travel of said gripper assembly and thereafter allowing relative movement of said mounting members at a point beyond the terminal end of the determined portion of the travel of said gripper assembly.

3. A gripper assembly comprising a pair of clamping elements arranged for movement toward and away from each other, means for moving said gripper assembly in a determined longitudinal path, means for mounting said assembly on said moving means, said mounting means comprising a pair of superposed mounting members arranged for relative longitudinal movement, spring means coupling said pair of mounting members, an angular lever pivotally mounted on one of said pair of members, said lever having a short arm interpivoted to the other of said pair of members, and a long arm, and guide means in fixed relation to said gripper assembly for engagement by the free end of the long arm of said lever, said guide means having an extended portion for locating said lever arm in a position to maintain said pair of members against relative movement and a portion beyond said extended portion for allowing said lever arm to assume a position permitting relative longitudinal movement of said pair of members.

4. A gripper assembly as in claim 3 wherein the force of said spring means is less than the pull-off force of said gripper assembly moving means.

5. In a device for gripping a moving tubular member comprising a plurality of gripper assemblies, means for moving said gripper assemblies in spaced relation to each other in a longitudinal path, each gripper assembly comprising a pair of clamping elements arranged for movement transversely of said longitudinal path toward each other to grip said tubular member and away from each other to disengage said tubular member, means for mounting each gripper assembly on said moving means, said mounting means comprising a pair of associated movably related mounting members, one of said mounting members being fixedly connected to said moving means, spring means coupling said mounting members for relative longitudinal movement, positioning means connected to the other mounting member for moving said other mounting member against the action of said spring coupling means, and control means along said longitudinal path engageable by said positioning means for adjusting the relative positions of said mounting members whereby the pull off force of said moving means is neutralized by the resistance offered by said gripped moving tubular member at a predetermined point in said longitudinal path corresponding to the point at which said clamped tubular member is disengaged by said pair of clamping elements.

6. In a device as in claim 5 wherein said positioning means includes lever means interpivoted to said pair of members, and said control means includes guide means fixedly positioned relative to said moving gripper assemblies engageable by an arm portion of said lever means for adjusting the position thereof whereby said pair of members may be selectively maintained in a fixed relation relative to each other or allowed to have relative longitudinal movement.

7. In a device as in claim 6 wherein said guide means includes a fixed portion engageable by said lever means during the clamping engagement of said clamping elements on said tubular member, and an adjustably movable portion engageable by said lever means when said clamping elements disengage said tubular member.

8. In a device as in claim 5 wherein said gripper assemblies are spaced to allow at least two of said assemblies to be in gripping relation to said tubular member at any given time.

References Cited in the file of this patent

UNITED STATES PATENTS 1,911,157   Leech _____ May 23, 1933